2,852,534
PRODUCTION OF ANTHRAQUINONYL NITRILES

Erwin Klingsberg, Mountainside, N. J., assignor to American Cyanamid Company, New York, N. Y., a corporation of Maine No Drawing. Application November 18, 1957
Serial No. 696,905

5 Claims. (Cl. 260—369)

This invention relates to a new process for the preparation of 2-anthraquinonyl nitriles, and more specifically it relates to a process of preparing 2-anthraquinonyl nitriles by the reaction of 2-anthraquinonyl aldazines with chlorine at elevated temperatures in dichlorobenzene solution.

Anthroquinonyl nitriles have up to now been prepared by the Sandmeyer reaction, which requires the diazotization of the corresponding amine and the reaction of the diazo with cuprous cyanide. This process is often very clumsy and difficult to work with because of the use of the cyanide which causes hazards. It furthermore gives low yields in many cases. There is a great need for a ready preparation of anthraquinone nitriles since such compounds can be polymerized to form triazines, or can be hydrolyzed to form free anthraquinone carboxylic acids. For example, for anthraquinone-2-carboxylic acids, the known preparation usually involves the oxidation of a side chain alkyl, a reaction which is characterized by heavy foaming which is difficult to control. A good preparation of anthraquinone acids from the more readily obtainable aldehydes is much needed in the art.

I have found that when a 2-anthraquinonyl aldazine is chlorinated with free chlorine in o-dichlorobenzene solution at elevated temperatures, preferably above 60° C., and preferably at much higher temperatures the sole product isolated is the corresponding 2-cyanoanthraquinone.

In the past, aldazines have been chlorinated to give chloroaldazines, and these chlorinated aldazines can, upon vigorous treatment, give cyano compounds. This has never been done in the anthraquinone series. It is most surprising to find that in a specific solvent and under specific conditions, the intermediate chloroaldazine is not isolated and cannot be detected, but rather the reaction proceeds readily to the corresponding 2-cyanoanthraquinone. This is all the more surprising since different conditions give the chloroaldazine.

The chlorinating agent and the solvent are very critical. The temperature in the process of my invention must be kept above 60° C. Preferably much higher temperatures of the order of 120–165° C., are used. The product readily separates upon cooling the dichlorobenzene solution, and can be isolated by filtration and washing.

The anthraquinone rings cannot have amino or hydroxy substituents during the chlorinations, since these groups cause ring chlorination instead of attack on the aldazine side chain. However, nitro groups can be present which can be transformed later to amino, alkoxy, hydroxy, etc. Thus the process of this invention is applicable to the azines of anthraquinone-2-aldehyde, 1-chloroanthraquinone-2-aldehyde, 1-nitroanthraquinone-2-aldehyde, 3-chloroanthraquinone-2-aldehyde, 4-chloroanthraquinone-2-aldehyde, 5-nitroanthraquinone-2-aldehyde, 5,6,7,8-tetrachloroanthraquinone-2-aldehyde, and the like.

My invention can be illustrated by the following examples in which parts are by weight unless otherwise specified.

Example 1

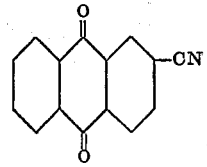

A mixture of 0.2 part of 2-anthraquinone carboxaldazine and 3 parts by volume of ortho-dichlorobenzene is heated at 160–165° C., while being treated with a stream of chlorine until the reaction is complete. On cooling the product separates and is washed with benzene; M. P. 216–217° C.

Example 2

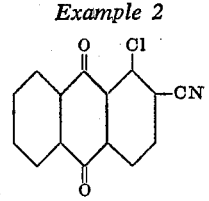

A steady stream of chlorine is passed through a mixture of 0.25 part of 1-chloro-2-anthraquinone carboxaldazine and 5 parts by volume of ortho dichlorobenzene, heated at 155° C. When the reaction is complete, the solution is cooled and the product filtered and washed with hexane.

The isomeric 3-chloro-2-cyanoanthraquinone is obtained by using the azine of 3-chloroanthraquinone-2-aldehyde.

Example 3

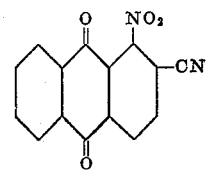

The procedure of Example 2 is followed using an equivalent amount of 1-nitro anthraquinonyl-2-carboxaldazine in place of the 1-chloroanthraquinone-2-carboxaldazine.

5-nitro anthraquinone-2-carboxaldazine when used in place of the 1-nitro isomer, yields the corresponding 5-nitro-2-cyano anthraquinone.

Example 4

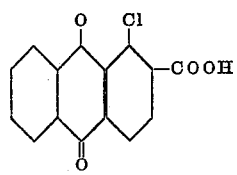

Thirteen and four tenths parts of the product of Example 2 is refluxed in 170 parts of concentrated $H_2SO_4$ and 30 parts of water until reaction is substantially complete. The mixture is cooled and the product, 1-chloroanthraquinone-2-carboxylic acid, is precipitated by dropwise addition of water. The mixture is heated and filtered. The crude product is purified by dissolution in dilute ammonia, filtering, and reprecipitating with acid.

1-chloroanthraquinone-2-carboxylic acid can be used as an intermediate for vat dyes, either directly in the preparation of acridones or by ammonolysis to 1-aminoanthraquinone-2-carboxylic acid which is a known intermediate for a number of vat dyes. This amino acid is also preparable by the similar hydrolysis of the product of Example 3 followed by reduction.

I claim:

1. A process of preparing an unaminated, unhydroxylated 2-cyanoanthraquinone which comprises heating a mixture of an unaminated, unhydroxylated 2-anthraquinonecarboxaldazine and ortho-dichlorobenzene at a temperature above 60° C., while passing chlorine therethrough.

2. The process of claim 1 in which the temperature is 120–165° C.

3. The process of claim 2 in which the anthraquinonyl adlazine is 2-anthraquinonecarboxaldazine.

4. The process of claim 2 in which the anthraquinonyl aldazine is 1-chloro-anthraquinone-2-carboxaldazine.

5. The process of claim 2 in which the aldazine is 1-nitroanthraquinone-2-carboxaldazine.

No references cited.